July 26, 1927.
F. M. DAVIS
1,637,176
WORK FEEDING AND CLAMPING MEANS FOR METAL WORKING MACHINES
Filed Nov. 3, 1924
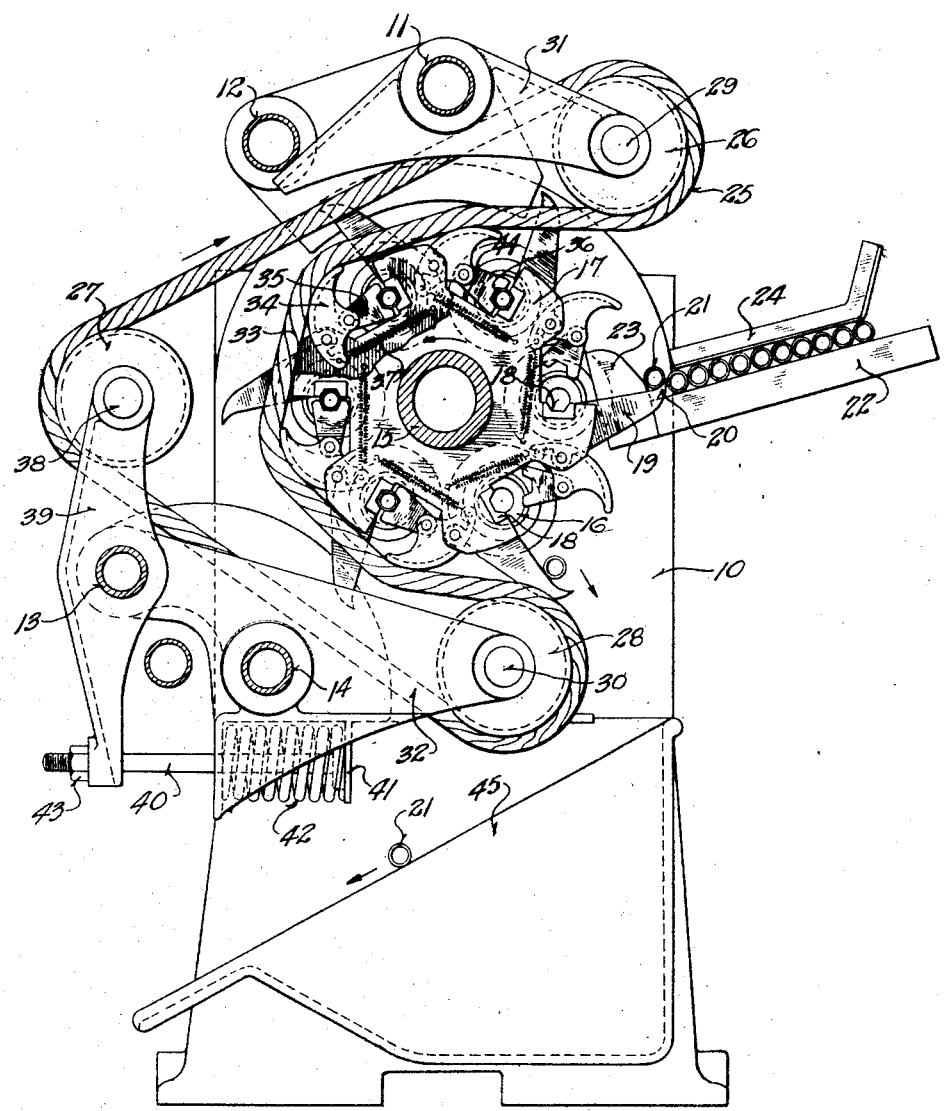

Patented July 26, 1927.

1,637,176

UNITED STATES PATENT OFFICE.

FRANK M. DAVIS, OF MILWAUKEE, WISCONSIN.

WORK FEEDING AND CLAMPING MEANS FOR METAL-WORKING MACHINES.

Application filed November 3, 1924. Serial No. 747,527.

The invention relates to metal-working machines.

An object of the invention is to provide a feeding and clamping means for metal working machines in which the work is automatically clamped to the work carrier in a vise mechanism actuated by an element travelling with the carrier during the cutting operation, whereby the work is held firmly against rotation.

Another object of the invention is to provide a work-feeding and clamping means for metal-working machines operating on cylindrical objects, such as rods or tubes, whereby successive work-pieces are rapidly fed to the machine for a cutting operation and are removed therefrom by gravity when finished.

The invention further consists in the several features hereinafter set forth and more particularly defined by claims at the conclusion hereof.

The drawing shows the mechanism embodying the invention applied to a machine for end-working, such as threading, a transverse section being taken through the machine at an intermediate plane and parts of the mechanism being broken away.

In the drawing, the numeral 10 designates a part of the frame of a thread cutting machine including longitudinally extending tubular members 11, 12, 13 and 14. A rotating work mandrel 15 is journalled in the frame and thread cutting dies 16 are disposed about the mandrel and rotate therewith. These parts and their arrangement are illustrative only, as the invention is applicable to different forms of metal working machines.

The work mandrel 15 together with a work-receiving means, such as axially-spaced spiders 17, forms a work-carrier. The spiders 17 are mounted on the mandrel to rotate therewith and are provided with jaws 18 to receive the work, such as pipes 18, but the work carrier is not restricted to this form as it is capable of many modifications and changes to suit it to the work at hand. It is understood that the invention in its broadest aspect is not to be limited to a rotating carrier.

The spiders 17 are provided with substantially radially extending work-receiving fingers 19 preferably having their outer ends 20 curved in the direction of movement and having their inner ends adjacent the jaws 18.

The work-pieces in the form of tubes 21, or rods, are placed to roll by gravity towards the spiders 17 in contiguous sequence on inclined supports 22 (one being shown), which are provided at their lower ends with upwardly curved stop members 23 so that the foremost work-piece lies in the path of the upwardly moving curved outer ends 20 of the fingers 19. A guide member 24 overlies the row of work-pieces on the inclined supports 22 to insure proper feed to the work carrier, but terminates short of the outer end of the inclined support to permit the work-pieces to be stacked on the support.

A clamping band, such as a cable 25, is mounted on guide pulleys 26, 27, and 28. Pulleys 26 and 28 are journalled on shafts 29 and 30, respectively mounted on frame members 31 and 32, respectively, secured to the frame 10. These pulleys bear such a relation to each other as to permit a loop or bend 33 to be formed in the cable partially surrounding the spider 17. The cable engages the curved outer surfaces of a number of levers 34 pivotally connected to the spider intermediate their ends and each having a toggle member 35 pivotally connected thereto to form a toggle joint. Each toggle member is provided with a jaw portion 36 adapted to cooperate with the jaw 18 on the spider to clamp a pipe or other work-piece between them. Each of the levers 34 has its inner end connected with a spring 37 secured to the spider to separate the work-clamping jaws for receiving and discharging the work. The jaw-forming toggle members together with their respective cable-engaging levers 34 form a series of toggle clamping mechanisms rotatable with the carrier.

The pulley 27 is mounted on a shaft 38 secured to the upper end of a lever 39 pivotally mounted intermediate its ends on the tubular frame member 13. The lower end of the lever 39 receives one end of a rod 40 having a plate 41 secured to its other end and bearing against a spring 42 mounted in the frame member 32, a nut 43 being threaded on the rod and bearing against the lever to adjust the tension of the spring. The spring 42 acting on the pulley 21 serves to tension or tighten the cable against the levers 34 of the toggle mechanisms to clamp the work between the clamping jaws 18 and 36.

While the mandrel 15 is rotating, the upwardly moving fingers 19 on the work-receiving spiders 17 engage the foremost of the row of work-pieces on the inclined supports 22 and lift it over the stop member 23, whereupon it rolls down the fingers into the jaw member 18 on the spider. While the work-piece is being lifted over the stop member 23, the succeeding work-piece rolls downward against it in position to be engaged by the succeeding fingers.

As the mandrel rotates the cable engages the rising lever 34 on the toggle mechanism and swings it against the action of the spring 37 to move the toggle member 35 along a guide surface 44 so that its jaw portion 36 engages the work-piece resting on the jaw 18 on the spider.

The work-piece is then firmly clamped in the jaws 18 and 36 against rotation and longitudinal movement by the toggle mechanism, the jaws being preferably provided with polygonal clamping surfaces to equalize the pressure on the work-piece and avoid deformation, especially of a pipe. The threading die 16, when a threading operation is desired, is then moved onto the pipe to cut threads thereon and is released when the operation is complete. It will be understood however, that other operations, such as milling, sawing, drilling, and grinding, may be performed instead.

As the work-piece approaches the lower part of its movement and the die has been released, the cable leaves its pressure engagement with the lever of the toggle mechanism, permitting the clamping jaws to open and discharge the work-piece, which rolls down the fingers 19 onto an inclined portion 45 of the frame 10, from which it leaves the machine.

The work-pieces are firmly clamped on the work carrier against rotation and are properly fed to the machine and discharged therefrom without any attention from the operator other than placing quantities of work-pieces on the outer ends of the inclined supports 22. The thread-cutting or other operation proceeds rapidly and simultaneously on a number of work-pieces, which makes it possible to produce large quantities of finished pieces in a short time. The provision of a tensioned band acting upon the toggle-clamping mechanisms not only affords a common yielding means for avoiding excessive clamping pressures in cases where clamping pressures must be limited but also imposes a uniform pressure on the several clamping mechanisms.

What I claim as new and desire to secure by Letters Patent is:

1. In a metal-working machine, the combination of a movable work carrier, toggle clamping mechanism movable with the work carrier, a cutting tool, and a yieldable tensioned band travelling with the work carrier during the cutting operation and operatively engageable at intervals with the toggle clamping mechanism for clamping the work on the carrier.

2. In a metal-working machine, the combination of a movable work carrier, toggle clamping mechanism movable with the work carrier, a cutting tool, and an endless yieldable tensioned band travelling with the work carrier during the cutting operation and intermittently engageable with the toggle clamping mechanism for clamping the work on the carrier.

3. In a metal-working machine, the combination of a rotatable work carrier, toggle clamping mechanism movable with the work carrier, a cutting tool, and an endless yieldable tensioned band travelling with the work carrier during the cutting operation and engageable with the toggle clamping mechanism during part of the travel of said mechanism for clamping the work on the carrier.

4. In a metal-working machine, the combination of a rotatable work carrier having relatively fixed work-receiving jaws, movable jaw members cooperating therewith and connected to the carrier, a cutting tool, and a tensioned band partially surrounding the carrier during the cutting operation and intermittently urging said movable jaw members adjacent said fixed jaws for clamping work between them.

5. In a metal-working machine, the combination of a rotatable work carrier having relatively fixed work-receiving jaws, movable jaw members cooperating therewith and connected to the carrier, a cutting tool, a tensioned band movable with and partially surrounding the carrier during the cutting operation and engageable with said movable jaw members to move them at intervals adjacent said relatively fixed jaws for clamping work therebetween, and means for holding said jaw members away from said jaws in the work-receiving and discharging positions.

6. In a metal-working machine, the combination of a rotatable work-carrier having relatively fixed work-receiving jaws, movable jaw members cooperating therewith, levers pivotally connected to the carrier and to said jaw members to form a toggle, a cutting tool, and a tensioned band movable with the carrier during the cutting operation and intermittently engageable with said levers for urging said movable jaw members adjacent said fixed jaws for clamping the work between them.

7. In a metal working machine, the combination, with a cutting tool, of a rotatable work carrier having work-receiving recesses, means for clamping work pieces in said recesses during the cutting operation, lifting fingers projecting from said work carrier adjacent said recesses, a support along which work pieces move towards said work carrier, and a stop limiting the movement of said work pieces towards said work carrier and positioning the foremost work-piece in the path of said lifting fingers, whereby said fingers will lift successive work-pieces over said stop for descent along said fingers into the recesses of said work carrier.

8. In a metal working machine, the combination, with a cutting tool, of a movable work carrier, a plurality of work-clamping mechanisms movable with said carrier, and a yieldable tensioned band operatively connected with said work-clamping mechanisms during part of their travel to effect the actuation of said mechanisms and to provide a common yielding means for said mechanisms.

In testimony whereof, I affix my signature.

FRANK M. DAVIS.